(12) United States Patent
Cao (10) Patent No.: US 11,636,764 B2
(45) Date of Patent: Apr. 25, 2023

(54) VEHICLE-TO-INFRASTRUCTURE COOPERATION INFORMATION PROCESSING METHOD, APPARATUS, DEVICE AND AUTONOMOUS VEHICLE

(71) Applicant: Apollo Intelligent Connectivity (Beijing) Technology Co., Ltd., Beijing (CN)

(72) Inventor: Huo Cao, Beijing (CN)

(73) Assignee: APOLLO INTELLIGENT CONNECTIVITY (BEIJING) TECHNOLOGY CO., LTD., Beijing (CN)

(*) Notice: Subject to any disclaimer, the term of this patent is extended or adjusted under 35 U.S.C. 154(b) by 46 days.

(21) Appl. No.: 17/208,644

(22) Filed: Mar. 22, 2021

(65) Prior Publication Data
US 2021/0225171 A1    Jul. 22, 2021

(30) Foreign Application Priority Data

Sep. 21, 2020   (CN) .......................... 202010995950.8

(51) Int. Cl.
  G08G 1/16     (2006.01)
  G06K 9/62     (2022.01)
  (Continued)

(52) U.S. Cl.
  CPC .......... *G08G 1/165* (2013.01); *G05D 1/0214* (2013.01); *G05D 1/0276* (2013.01);
  (Continued)

(58) Field of Classification Search
  CPC .... G06K 9/00791; G06K 9/6289; G06K 9/62; G08G 1/16; G08G 1/0967; G05D 1/02
  See application file for complete search history.

(56) References Cited

U.S. PATENT DOCUMENTS 10,501,015 B2 * 12/2019 Park ........................ H04N 5/247
2019/0249999 A1    8/2019 Agarwal et al.
(Continued)

FOREIGN PATENT DOCUMENTS

CN    106920412    7/2017
CN    108010360    5/2018
(Continued)

OTHER PUBLICATIONS

Extended European Search Report EP 21164233.5 (dated Oct. 13, 2021) (10 pages).
(Continued)

*Primary Examiner* — Tan Q Nguyen
(74) *Attorney, Agent, or Firm* — Norton Rose Fulbright US LLP (57) ABSTRACT

A vehicle-to-infrastructure cooperation information processing method, apparatus, device and an autonomous vehicle are provided. The method includes: acquiring first on-board perception data of a target vehicle, the first on-board perception data including data of an obstacle around the target vehicle sensed by the target vehicle; generating virtual obstacle data for representing the target vehicle according to positioning data of the target vehicle; generating second on-board perception data based on the virtual obstacle data and the first on-board perception data; and fusing the second on-board perception data with roadside perception data to obtain fusion data, the fusion data including all obstacle data in both the second on-board perception data and the roadside perception data, and the obstacle data in the roadside perception data including obstacle data for representing the target vehicle.

17 Claims, 9 Drawing Sheets

(51) Int. Cl.
*H04W 4/44* (2018.01)
*G05D 1/02* (2020.01)
*G06V 20/58* (2022.01)

(52) U.S. Cl.
CPC ........... *G06K 9/6288* (2013.01); *G06V 20/58* (2022.01); *G06V 20/584* (2022.01); *H04W 4/44* (2018.02)

(56) References Cited

U.S. PATENT DOCUMENTS

| | | | | |
|---|---|---|---|---|
| 2020/0149906 | A1* | 5/2020 | Tu | G05D 1/0289 |
| 2020/0409372 | A1* | 12/2020 | Yu | G01S 7/003 |
| 2021/0300427 | A1* | 9/2021 | Tao | B60W 60/0027 |
| 2022/0091608 | A1* | 3/2022 | Feng | G05D 1/005 |
| 2022/0242450 | A1* | 8/2022 | Sokolov | B60W 60/0015 |
| 2022/0252420 | A1* | 8/2022 | Shen | G06V 10/74 |

FOREIGN PATENT DOCUMENTS

| | | |
|---|---|---|
| CN | 108182817 | 6/2018 |
| CN | 108447291 | 8/2018 |
| CN | 110083163 | 8/2019 |
| CN | 110335488 | 10/2019 |
| CN | 110874945 | 3/2020 |
| CN | 110928284 | 3/2020 |
| CN | 111127931 | 5/2020 |
| CN | 111540237 | 8/2020 |
| DE | 10 2018 217840 | 4/2020 |
| JP | 2006-195641 | 7/2006 |
| JP | 2008-191988 | 8/2008 |
| JP | 2009-122838 | 6/2009 |
| JP | 2011-242846 | 12/2011 |
| JP | 2017-173948 | 9/2017 |
| WO | WO 2014/198484 | 12/2014 |

OTHER PUBLICATIONS

Notification of the First Office Action CN 202010995950.8 (dated May 8, 2021) (21 pages).
Chinese Search Report CN 202010995950.8 (dated Apr. 28, 2021) (5 pages).
Japanese Notice of Reasons for Refusal JP 2021-048067 (dated Sep. 13, 2022) (8 pages).

* cited by examiner

VEHICLE-TO-INFRASTRUCTURE COOPERATION INFORMATION PROCESSING METHOD, APPARATUS, DEVICE AND AUTONOMOUS VEHICLE

CROSS-REFERENCE TO RELATED APPLICATION

This application claims priority to Chinese patent application No. 202010995950.8, filed on Sep. 21, 2020, which is hereby incorporated by reference in its entirety.

TECHNICAL FIELD

The present application relates to the technical fields of intelligent transportation, autonomous driving and vehicle-to-infrastructure cooperation.

BACKGROUND

In order to assist data collection and processing of an intelligent driving vehicle, in the related art, an on-board perception system is usually used to acquire road data in a surrounding environment when the vehicle is driving.

SUMMARY

In order to solve at least one problem in the related art, embodiments of the present application provide a vehicle-to-infrastructure cooperation information processing method, apparatus, device and an autonomous vehicle.

In a first aspect, one embodiment of the present application provides a vehicle-to-infrastructure cooperation information processing method, including:

acquiring first on-board perception data of a target vehicle, the first on-board perception data including data of an obstacle around the target vehicle sensed by the target vehicle;

generating virtual obstacle data for representing the target vehicle according to positioning data of the target vehicle;

generating second on-board perception data based on the virtual obstacle data and the first on-board perception data; and fusing the second on-board perception data with roadside perception data to obtain fusion data, the fusion data including all obstacle data in both the second on-board perception data and the roadside perception data, and obstacle data in the roadside perception data including obstacle data for representing the target vehicle.

In a second aspect, one embodiment of the present application provides a vehicle-to-infrastructure cooperation information processing apparatus, including:

a first on-board perception data module configured for acquiring first on-board perception data of a target vehicle, the first on-board perception data including data of an obstacle around the target vehicle sensed by the target vehicle;

a virtual obstacle data module configured for generating virtual obstacle data for representing the target vehicle according to positioning data of the target vehicle;

a second on-board perception data module configured for obtaining second on-board perception data based on the virtual obstacle data and the first on-board perception data; and a first fusion module configured for fusing the second on-board perception data with roadside perception data to obtain fusion data, the fusion data including all obstacle data in both the second on-board perception data and the roadside perception data, and the obstacle data in the roadside perception data including obstacle data for representing the target vehicle.

In a third aspect, one embodiment of the present application provides an electronic device, including:

at least one processor; and a memory communicatively connected with the at least one processor; wherein, the memory stores instructions executable by the at least one processor, the instructions are executed by the at least one processor to enable the at least one processor to implement the method provided in any one of the embodiments of the present application.

In a fourth aspect, one embodiment of the present application provides a non-transitory computer-readable storage medium storing computer instructions, wherein the computer instructions enable a computer to perform the method provided in any one of the embodiments of the present application.

In a fifth aspect, one embodiment of the present application provides an autonomous vehicle, including the electronic device provided in any one of the embodiments of the present application.

BRIEF DESCRIPTION OF THE DRAWINGS

The drawings are included to provide a better understanding of the solution and are not to be construed as limiting the application. Wherein.

DETAILED DESCRIPTION

The exemplary embodiments of the present application are described below in combination with the accompanying drawings, which include various details of the embodiments of the present application to facilitate understanding, and should be considered as merely exemplary. Accordingly, a person skilled in the art should appreciate that various changes and modifications can be made to the embodiments described herein without departing from the scope and spirit of the present application. Also, descriptions of well-known functions and structures are omitted from the following description for clarity and conciseness.

Due to incomplete information collection of the on-board perception system itself, road environment data acquired by a roadside perception system may be used for data fusion. The data acquired by the roadside perception system and the data acquired by the on-board perception system can complement each other in missing data. However, these two types of data are collected by two different data collection systems, and a plurality of data processing operations are required during fusion. Therefore, a data fusion method which can quickly and accurately fuse the two types of data is needed.

Figure 1:
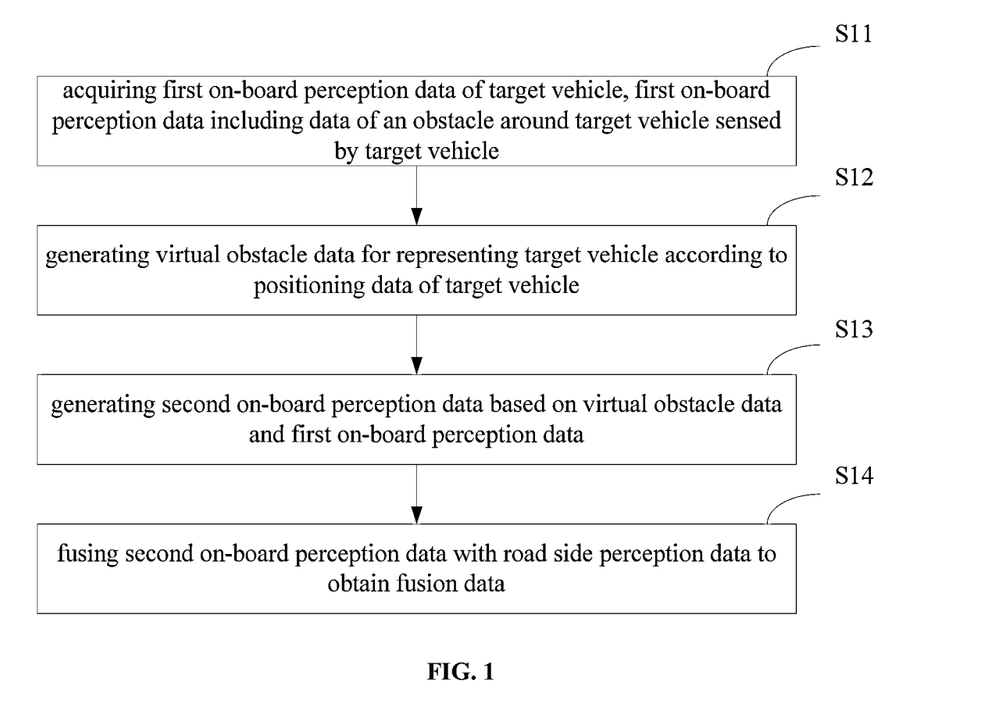
FIG. 1 is a first schematic diagram of a vehicle-to-infrastructure cooperation information processing method according to an embodiment of the present application.

As shown in FIG. 1, one embodiment of the present application provides a vehicle-to-infrastructure cooperation information processing method, including:

Step S11: acquiring first on-board perception data of a target vehicle, the first on-board perception data including data of an obstacle around the target vehicle sensed by the target vehicle;

Step S12: generating virtual obstacle data for representing the target vehicle according to positioning data of the target vehicle;

Step S13: generating second on-board perception data based on the virtual obstacle data and the first on-board perception data; and Step S14: fusing the second on-board perception data with roadside perception data to obtain fusion data, the fusion data including all obstacle data in both the second on-board perception data and the roadside perception data, and the obstacle data in the roadside perception data including obstacle data for representing the target vehicle.

In this embodiment, the first on-board perception data may be obtained by an on-board perception system of the target vehicle. The first on-board perception data includes data of the obstacle around the target vehicle and sensed by the target vehicle, that is, the first on-board perception data may include a plurality of obstacle data. The on-board perception system may include a laser radar, a video capture apparatus, etc.

In this embodiment, obstacles may refer to all objects that can be detected by the on-board perception system, such as persons, vehicles, animals, or fixed obstacles in roads. For each obstacle that can be sensed by the on-board perception system, corresponding obstacle data is generated in the first on-board perception data. For example, the on-board perception system senses a first vehicle and a second vehicle around the target vehicle, and then the first on-board perception data includes obstacle data of the first vehicle and obstacle data of the second vehicle accordingly.

For another example, the on-board perception system senses a first pedestrian and a second pedestrian around the target vehicle, and then the first on-board perception data includes obstacle data of the first pedestrian and obstacle data of the second pedestrian accordingly.

Since the first on-board perception data is sensed by the target vehicle through the on-board perception system, the first on-board perception data does not include obstacle data of the target vehicle itself, and generally includes obstacle data of other obstacles around the target vehicle.

In this embodiment, the positioning data of the target vehicle may be obtained by an on-board positioning apparatus. For example, the positioning data of the target vehicle may be obtained through an on-board global position system (GPS). For another example, the positioning data of the target vehicle may be obtained through an on-board base station positioning system.

The positioning data of the target vehicle may specifically include a geographic coordinate position of the target vehicle, a road section and a lane position of the target vehicle on a high-precision map, and heading of the target vehicle, etc.

The virtual obstacle data of the target vehicle is not actually collected by the on-board perception system, and is generated virtually in the on-board perception data. Since the first on-board perception data does not include the obstacle data of the target vehicle, it may be set artificially to generate the virtual obstacle data of the target vehicle according to the positioning data of the target vehicle. The virtual obstacle data may include a box and another graphic with heading information. The heading information of virtual obstacle data is set according to actual heading of the target vehicle.

The generating the second on-board perception data based on the virtual obstacle data and the first on-board perception data, may include: determining a geographic position of the vehicle according to positioning data of a center of the target vehicle; adding a center of an virtual obstacle to a position corresponding to the positioning data in the first on-board perception data; taking the first on-board perception data added with the virtual obstacle data as the second on-board perception data.

In this embodiment, the roadside perception data may be traffic data on roads collected by perception apparatus provided on two sides of roads or at road junctions. For example, the roadside perception data may be road data collected by a radar apparatus provided at a road junction, or, may be road data collected by video collection apparatus provided on two sides of a road. The roadside perception data includes all obstacles sensed by the roadside perception system. In this embodiment, the roadside perception data is data collected by a roadside perception system in the same road section as the target vehicle. Since the roadside perception system can generally sense all obstacles in the road section where the roadside perception system is located, the roadside perception data includes obstacle data generated when the target vehicle is actually sensed by the roadside perception system.

When the embodiment of the present application is applied to an autonomous vehicle, the autonomous vehicle may communicate with the roadside perception system through an on board unit (OBU). The roadside perception system includes a roadside perception apparatus and a roadside computing apparatus. Perception data obtained by the roadside perception apparatus is transmitted to the roadside computing apparatus for processing, and then the autonomous vehicle can receive the processed perception data transmitted by the roadside computing apparatus through the OBU, and fuse it with its own on-board perception data. The roadside computing apparatus may wirelessly communicate with the OBU through a roadside unit (RSU), or wirelessly communicate with the OBU directly.

The roadside perception data may include data collected by at least one roadside perception system or a group of roadside perception systems. The data collected by each roadside perception system or a set of roadside perception systems is taken as one channel roadside perception data; and the data collected by multiple or multiple sets of roadside perception systems is taken as multi-channel roadside perception data. In the fusion process, when there are multi-channel roadside perception data, the multi-channel roadside perception data may be fused first, and then fused with the second on-board perception data. The multi-channel roadside perception data may also be simultaneously fused with the second on-board perception data.

The fusing the second on-board perception data with the roadside perception data, may include: fusing the obstacle data in the second on-board perception data with the obstacle data in the roadside perception data, thereby obtaining an union of the obstacle data in the second on-board perception data and the obstacle data in the roadside perception data.

Since the roadside perception system can actually collect the obstacle data of the target vehicle and the on-board perception apparatus cannot collect the obstacle data of the target vehicle itself, therefore, obstacles may be inconsistent between the data collected by the on-board perception system for the target vehicle and the data collected by the roadside perception system for the target vehicle. In the embodiment of the present application, the virtual obstacle data of the target vehicle is added to the first on-board perception data obtained by the on-board perception system of the target vehicle to obtain the second on-board perception data, and then the second on-board perception data is fused with the roadside perception data obtained by the roadside perception system. The processing of the first on-board perception data is relatively easy and may be performed immediately after collection data of a vehicle collection system is generated. Therefore, the method provided in this embodiment of the present application is applied to a main vehicle (target vehicle) discovery and full perception fusion framework, and through a relatively simplified data pre-processing work, the second on-board perception data and the roadside perception data acquired by the roadside perception system can be fused through a quicker fusion operation, thereby providing more efficient preparation data for downstream products to use the fusion data.

In one embodiment, the generating the virtual obstacle data for representing the target vehicle according to the positioning data of the target vehicle, includes:

acquiring appearance information of the target vehicle;

generating a virtual data frame according to the appearance information of the target vehicle;

obtaining a center point position and heading of the target vehicle according to the positioning data of the target vehicle; and generating the virtual obstacle data for representing the target vehicle based on the virtual data frame and the center point position and heading of the target vehicle.

In this embodiment, the appearance information of the target vehicle may be obtained through factory setting data of the target vehicle, and may specifically include information such as model, color, and size of the target vehicle. Size and shape of the virtual data frame may be consistent with the appearance information of the target vehicle.

In other embodiments, a position of other fixed point on the target vehicle may be obtained according to the positioning data. For example, a position of a front-end midpoint on the target vehicle may be obtained. The virtual data frame is set according to the center point position and heading of the target vehicle as well as other appearance information of the target vehicle, so that the virtual obstacle data represents an obstacle consistent with the information of appearance, heading and position of the target vehicle in the second on-board perception data.

Since the first on-board perception data is generated at a vehicle side of the target vehicle, it is only needed for the target vehicle to add an obstacle representing itself to the first on-board perception data, and thus the data processing amount is small and the data processing difficulty is small. When data sources of the roadside perception data increase, data processing operations for the target vehicle are not much and the data processing efficiency is high.

In one embodiment, the generating the second on-board perception data based on the virtual obstacle data and the first on-board perception data, includes:

assigning a first target value to a type field of the virtual obstacle data for representing the target vehicle; and adding the virtual obstacle data assigned with the first target value to the first on-board perception data to obtain the second on-board perception data.

In this embodiment, the virtual obstacle data of the target vehicle includes a type field. When creating the virtual obstacle data of the target vehicle, the first target value is assigned to the type field, to indicate that the obstacle is the target vehicle. Or, after creating the virtual obstacle data of the target vehicle, the virtual obstacle data of the target vehicle is added to the first on-board perception data to obtain the second on-board perception data, and then the first target value is assigned to a type field of virtual data of the target vehicle in the second on-board perception data.

In this embodiment, the first target value is assigned to the type field of the virtual obstacle data of the target vehicle, so that the virtual obstacle can be distinguished from other obstacles, which facilitates operations in subsequent data fusion, such as identification of the obstacle data of the target vehicle and elimination of the target vehicle.

In one embodiment, the fusing the second on-board perception data with the roadside perception data to obtain the fusion data, includes:

generating first obstacle data for representing the target vehicle, according to the virtual obstacle data for representing the target vehicle in the second on-board perception data and the obstacle data for representing the target vehicle in the roadside perception data;

determining a blind zone obstacle according to the second on-board perception data and the roadside perception data; generating second obstacle data based on the blind zone obstacle; where a second target value is assigned to a type field of the second obstacle data; and obtaining the fusion data according to the first obstacle data and the second obstacle data.

In this embodiment, a type field of the first obstacle data is assigned according to the type of the virtual obstacle data.

The virtual obstacle data of the target vehicle may be directly used as the first obstacle data, and the type field of the first obstacle data may be assigned with the first target value.

The obstacle data of the target vehicle in the roadside perception data may be directly used as the first obstacle data, and the type field of the first obstacle data may be assigned with the first target value.

The virtual obstacle data of the target vehicle and the obstacle data of the target vehicle may be calculated, and then a calculation result is taken as the first obstacle data, and the type field of the first obstacle data may be assigned with the first target value.

Finally, the fusion data is obtained according to the first obstacle data and other obstacle data in the fusion data.

The first obstacle data is generated according to the virtual obstacle data of the target vehicle and the obstacle data of the target vehicle; and then the fusion data is generated according to the first obstacle data, and the type field of the first obstacle data is assigned with the first target value. Therefore, when fusing the data, there is no need to eliminate the target vehicle from the roadside perception data in order to avoid that obstacle data consistent with the target vehicle in the roadside perception data is unable to be found in the on-board perception data. Further, when the target vehicle is subsequently eliminated from the fusion data, there is no need to search in a plurality of obstacle data, and the first obstacle data can be identified directly through the first target value, which provides convenience for subsequent data processing.

The determining the blind zone obstacle according to the second on-board perception data and the roadside perception data, may include:

determining an obstacle which only exists in the second on-board perception data, as a blind zone obstacle; and determining an obstacle which only exists in the roadside perception data, as a blind zone obstacle.

In other embodiments, the roadside perception data may be data collected by a plurality of different roadside perception systems. In this case, roadside perception data collected by each roadside perception system is one channel data. An obstacle, which is missing in one channel roadside perception data but exists in other channel roadside perception data, or which is missing in one channel roadside perception data but exists in the second on-board perception data, is a blind zone obstacle.

The second target value is used to indicate that an obstacle corresponding to the obstacle data is a blind zone obstacle.

In other embodiments, the blind zone obstacle in the second on-board perception data may be distinguished from the blind zone obstacle in the roadside perception data. Different second target values may be assigned to distinguish the blind zone obstacle in the second on-board perception data from the blind zone obstacle in the roadside perception data. In the fusion data, the first obstacle data and the second obstacle data are simultaneously added, the first target value is assigned to the type field of the first obstacle data, the second target value is assigned to the type field of the second obstacle data, so that it is possible to easily and quickly determine which obstacle is the target vehicle and which obstacle or obstacles are the blind zone obstacles in the fusion data, thereby providing data support for determining a data collection blind spot for the target vehicle or a roadside collection apparatus.

In this embodiment, the vehicle-to-infrastructure cooperation information processing method further includes: fusing a non-blind zone obstacle in the second on-board perception data with a non-blind zone obstacle in the roadside perception data, to obtain at least one non-blind zone obstacle in the fusion data. Then, when converting the fusion data, a field corresponding to the non-blind zone obstacle is filled. The non-blind zone obstacle may not be marked. The non-blind zone obstacle is an obstacle that exists in both the roadside perception data and the second on-board perception data.

Figure 2:
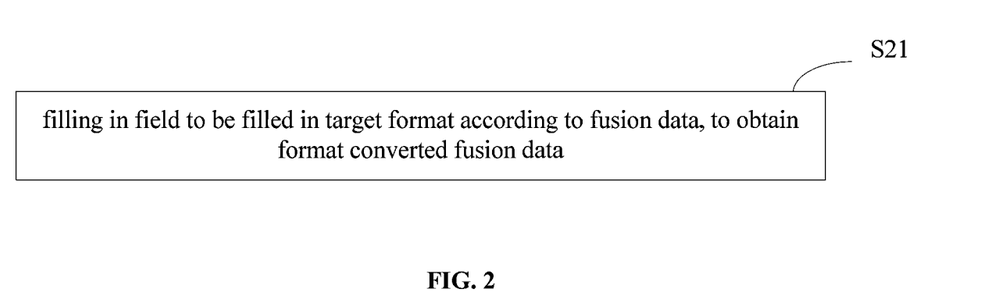
FIG. 2 is a second schematic diagram of a vehicle-to-infrastructure cooperation information processing method according to another embodiment of the present application.

In one embodiment, as shown in FIG. 2, the vehicle-to-infrastructure cooperation information processing method further includes:

Step S21: filling a field to be filled in data of a target format according to the fusion data, to obtain format converted fusion data; wherein the data of the target format includes a plurality of fields to be filled.

In this embodiment, after the data format is converted, the fusion data may be displayed at one end of the target vehicle.

In this embodiment, before performing the data fusion, the first on-board perception data and the roadside perception data are converted into the same format, respectively. Or, the second on-board perception data and the roadside perception data are converted into the same format, respectively.

After data conversion, the fusion data is easy for data transmission, thereby realizing vehicle communication and other purposes, and the fusion data is also easily displayed on a display apparatus.

In one embodiment, the filling the field to be filled in the data of the target format according to the fusion data, to obtain the format converted fusion data, includes:

skipping a first field to be filled corresponding to the first obstacle data in the data of the target format, to obtain a first filling result;

filling the second obstacle data of the fusion data into a corresponding second field to be filled in the data of the target format and adding a blind zone obstacle mark to obtain a second filling result;

obtaining the format converted fusion data, according to the first filling result and the second filling result.

In this embodiment, when filling a field in the data of the target format corresponding to the first obstacle, the field to be filled is skipped, so that the field to be filled is empty and then the target vehicle can be eliminated from the format converted fusion data.

When filling a field in the data of the target format corresponding to the second obstacle, the field to be filled is marked with a mark which is used to indicate that the obstacle is a blind zone obstacle, thereby facilitating use of the data in the downstream, for example, the target vehicle can determine its own blind zone according to the fusion data.

The vehicle-to-infrastructure cooperation information processing method provided in the embodiment of the present application may also be applied to vehicles without an on-board perception system, which is only used to fuse one or more channels of roadside perception data. When the method is applied to a vehicle without an on-board perception system, during fusion of one or more channels of roadside perception data, the target vehicle may be identified and eliminated in the roadside perception data, or, the target vehicle may be identified and eliminated in fused data of one or more channels of roadside perception data.

Figure 3:
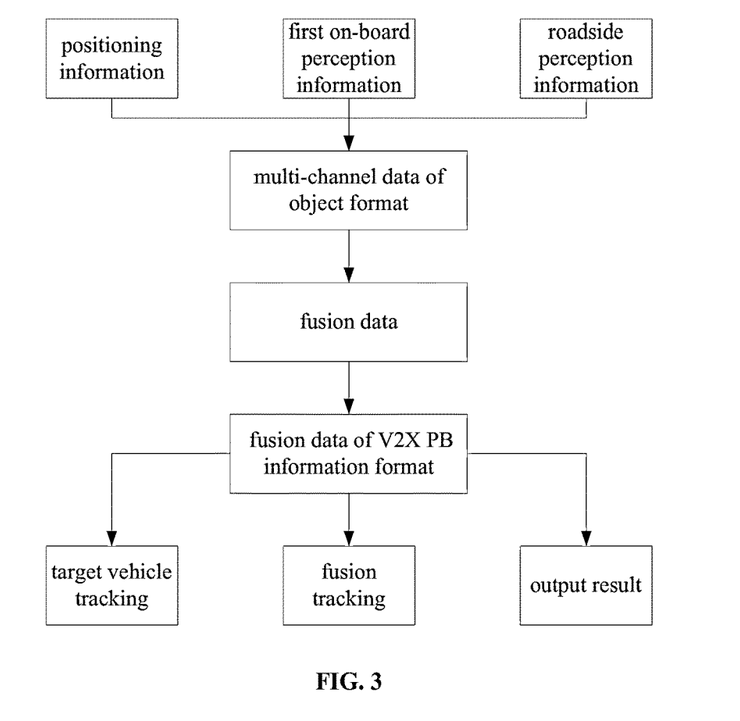
FIG. 3 is a schematic diagram of a vehicle-to-infrastructure cooperation information processing according to an example of the present application.

In one example, various information processed by the vehicle-to-infrastructure cooperation information processing method provided in the present application is shown in FIG. 3. Firstly, multi-channel callback information including positioning information, first on-board perception information and roadside perception information, is obtained. The multi-channel callback information of protocol buffers (PB) format is converted into data structures of a unified object format. Then, multi-channel data of the object format are fused. Before fusion, the virtual obstacle data of the target vehicle is first added to the first on-board perception information according to the positioning information, to obtain the second on-board perception information, and then the second on-board perception information is fused with the roadside perception information. Specifically, a vehicle-side fusion adapter based on Vehicle to Everything (V2X, wireless communication technology for vehicles) may be used for data fusion.

In specific operations, the virtual obstacle data of the target vehicle may be added to the first on-board perception information while converting the first on-board perception information into the object data format, thereby obtaining the second on-board perception information of the object format.

After the second on-board perception information of the object format is fused with the roadside perception information of the object format, the fusion data of the object format is obtained. The fusion data of the object format may be converted into V2X PB information format.

Further, since there may be occasional data missing when the on-board perception system or the roadside perception system captures data, target vehicle tracking may be performed on data after fusion or before fusion. In response to absence of a target vehicle, target vehicle data may be supplemented. It is also possible to perform target vehicle tracking when performing data fusion, and to supplement target vehicle data in response to absence of a target vehicle.

Meanwhile, fusion tracking may be performed on data after fusion or before fusion. In response to absence of other obstacle, other obstacle data may be supplemented. It is also possible to perform fusion tracking when performing data fusion, and to supplement other obstacle data in response to absence of other obstacle.

Finally, according to the fusion data of V2X PB information format, an output result is obtained. The output result includes the blind zone obstacle data.

In one embodiment, the vehicle-to-infrastructure cooperation information processing method further includes:

controlling the target vehicle according to the fusion data.

The controlling the target vehicle according to the fusion data, for example, includes: displaying, in the fusion data, unique information of the roadside perception data such as a blind-zone vehicle and a zombie vehicle (which is a vehicle with one or more of conditions including: long-term occupation of public roads and their sides, parking lots, residential quarters, green belts and other areas for parking, long-term unmanned maintenance and use, dilapidated and damaged appearance, dust all over, flat tires, missing number plates, etc.); making decision and control of an autonomous vehicle based on the fusion data. For example, for blind-zone vehicles or other blind-zone obstacles that are not detected by the on-board perception system, after they are found through the fusion data, the obstacles can be avoided in time in an automatic driving planning route to avoid safety hazards. For another example, a zombie vehicle which is determined according to the fusion data, can be avoided in an automatic driving planning route.

This embodiment solves the problem of fusion of the roadside perception information and the on-board perception information, provides more comprehensive information, and provides beneficial information for decision-making and control of autonomous vehicles.

Figure 4:
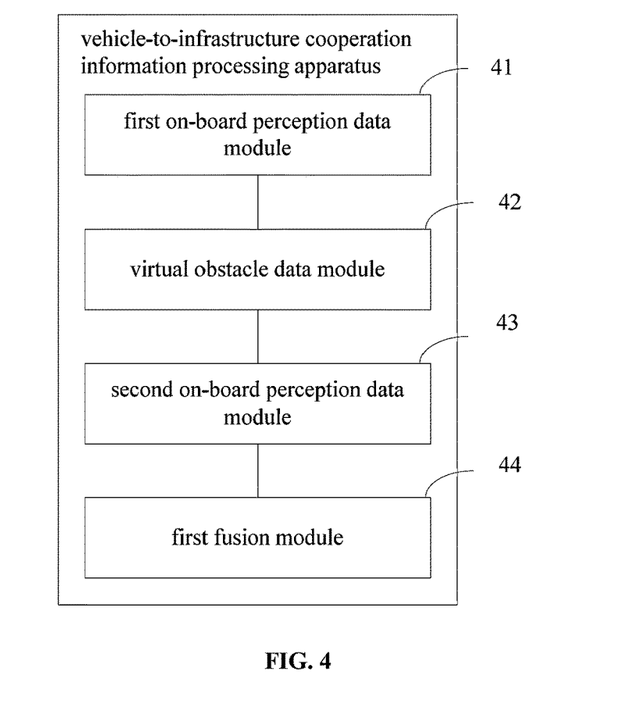
FIG. 4 is a first schematic diagram of a vehicle-to-infrastructure cooperation information processing apparatus according to an embodiment of the present application.

One embodiment of the present application further provides a vehicle-to-infrastructure cooperation information processing apparatus, as shown in FIG. 4, including:

a first on-board perception data module 41 configured for acquiring first on-board perception data of a target vehicle, the first on-board perception data including data of an obstacle around the target vehicle sensed by the target vehicle;

a virtual obstacle data module 42 configured for generating virtual obstacle data for representing the target vehicle according to positioning data of the target vehicle;

a second on-board perception data module 43 configured for obtaining second on-board perception data based on the virtual obstacle data and the first on-board perception data; and a first fusion module 44 configured for fusing the second on-board perception data with roadside perception data to obtain fusion data, the fusion data including all obstacle data in both the second on-board perception data and the roadside perception data, and the obstacle data in the roadside perception data including obstacle data for representing the target vehicle.

Figure 5:
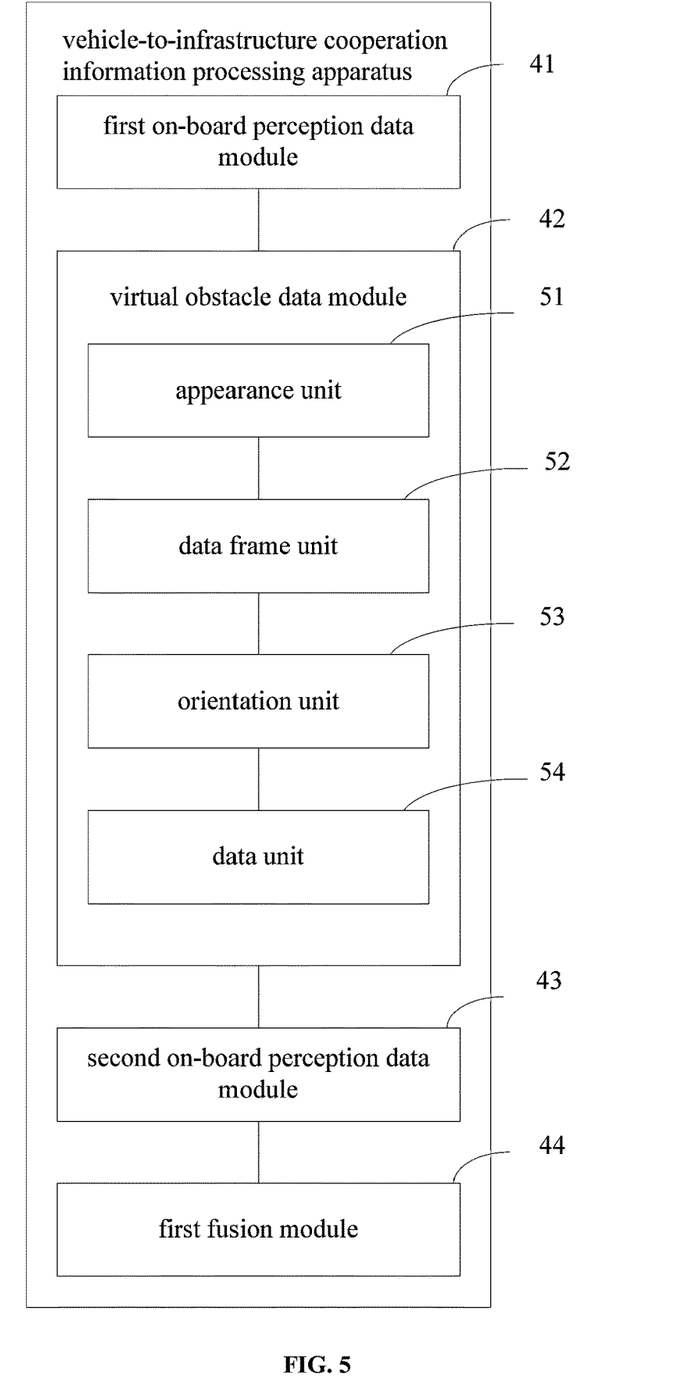
FIG. 5 is a second schematic diagram of a vehicle-to-infrastructure cooperation information processing apparatus according to an embodiment of the present application.

In one embodiment, as shown in FIG. 5, the virtual obstacle data module 42 includes:

an appearance unit 51 configured for acquiring appearance information of the target vehicle;

a data frame unit 52 configured for generating a virtual data frame according to the appearance information of the target vehicle;

an orientation unit 53 configured for obtaining a center point position and heading of the target vehicle according to the positioning data of the target vehicle; and a data unit 54 configured for generating the virtual obstacle data for representing the target vehicle by setting the virtual data frame according to the center point position and heading of the target vehicle.

Figure 6:
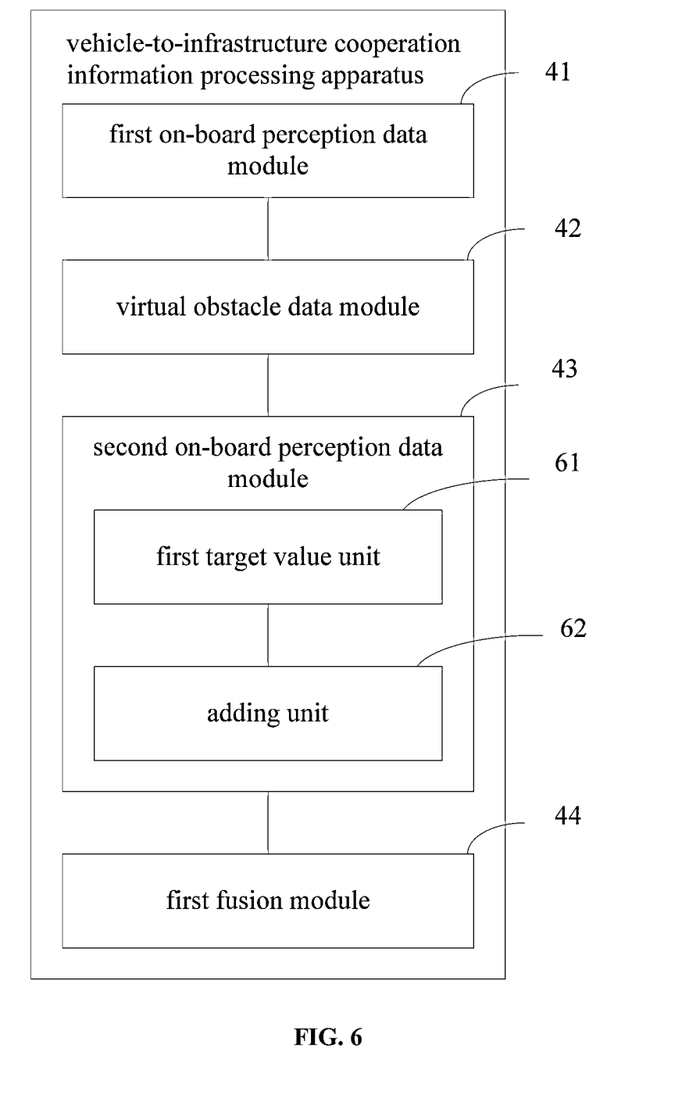
FIG. 6 is a third schematic diagram of a vehicle-to-infrastructure cooperation information processing apparatus according to an embodiment of the present application.

In one embodiment, as shown in FIG. 6, the second on-board perception data module 43 includes:

a first target value unit 61 configured for assigning a first target value to a type field of the virtual obstacle data for representing the target vehicle; and an adding unit 62 configured for adding the virtual obstacle data assigned with the first target value to the first on-board perception data to obtain the second on-board perception data.

Figure 7:
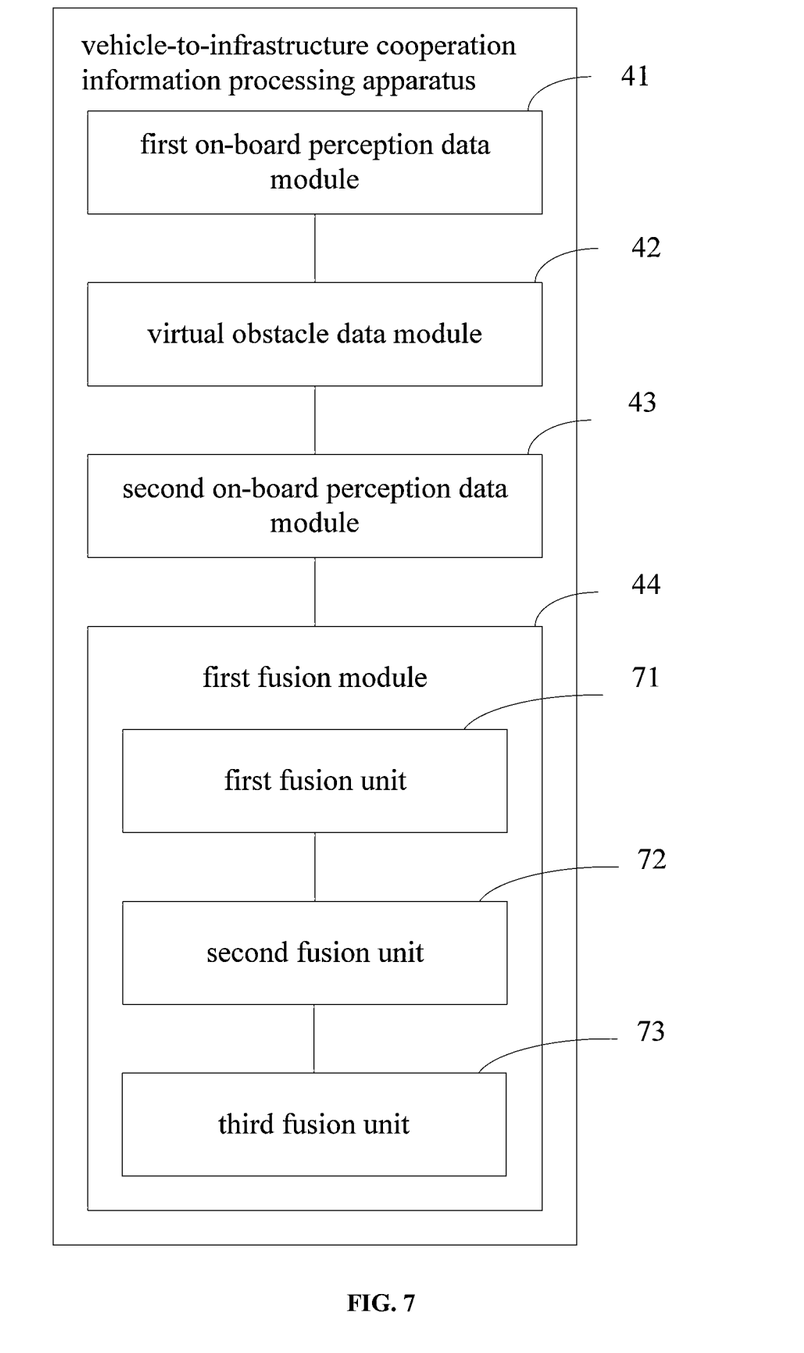
FIG. 7 is a fourth schematic diagram of a vehicle-to-infrastructure cooperation information processing apparatus according to an embodiment of the present application.

In one embodiment, as shown in FIG. 7, the first fusion module 44 includes:

a first fusion unit 71 configured for generating first obstacle data for representing the target vehicle, according to the virtual obstacle data for representing the target vehicle in the second on-board perception data and the obstacle data for representing the target vehicle in the roadside perception data;

a second fusion unit 72 configured for determining a blind zone obstacle according to the second on-board perception data and the roadside perception data; generating second obstacle data based on the blind zone obstacle; wherein a second target value is assigned to a type field of the second obstacle data; and a third fusion unit 73 configured for obtaining the fusion data according to the first obstacle data and the second obstacle data.

Figure 8:
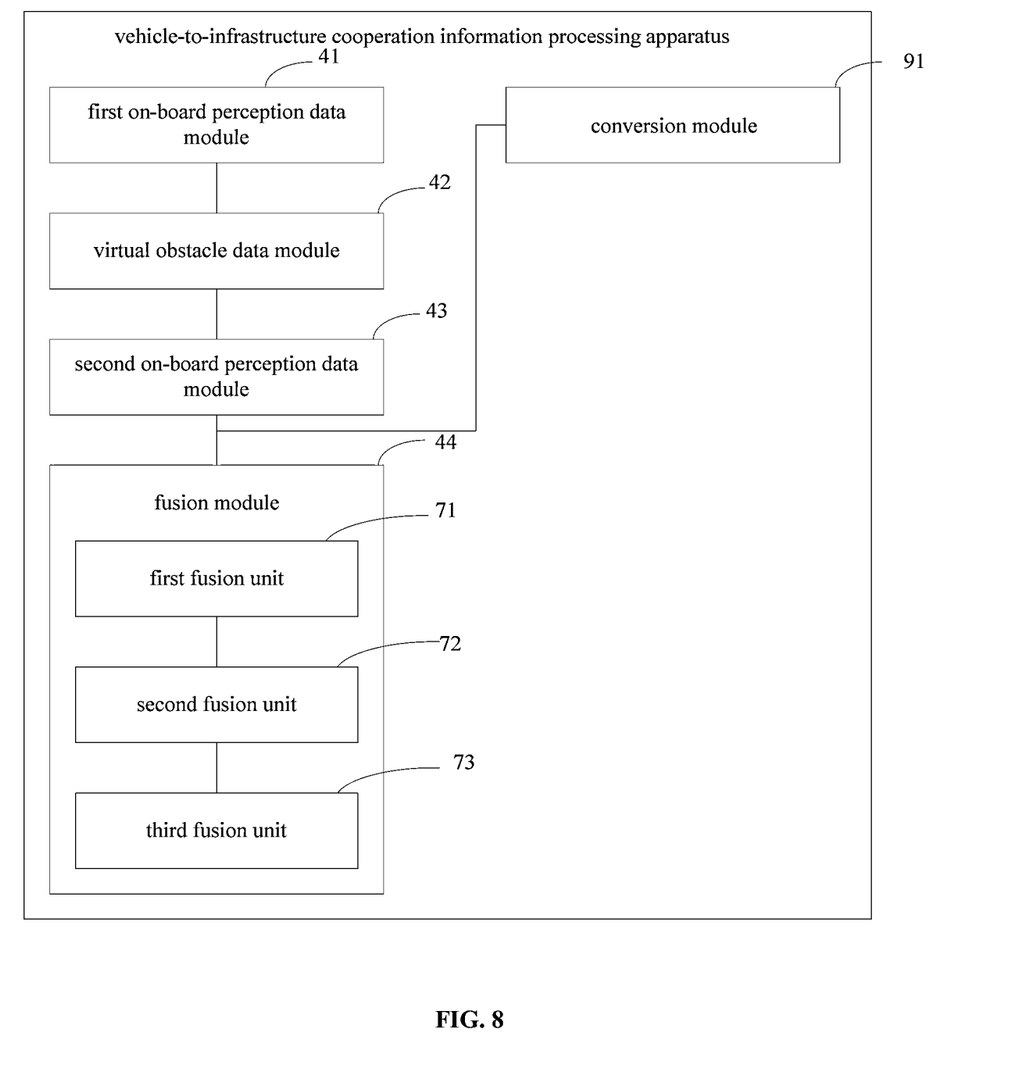
FIG. 8 is a fifth schematic diagram of a vehicle-to-infrastructure cooperation information processing apparatus according to an embodiment of the present application.

In one embodiment, as shown in FIG. 8, the apparatus further includes:

a conversion module 91 configured for filling a field to be filled in data of a target format according to the fusion data, to obtain format converted fusion data; wherein the data of the target format includes a plurality of fields to be filled.

Figure 9:
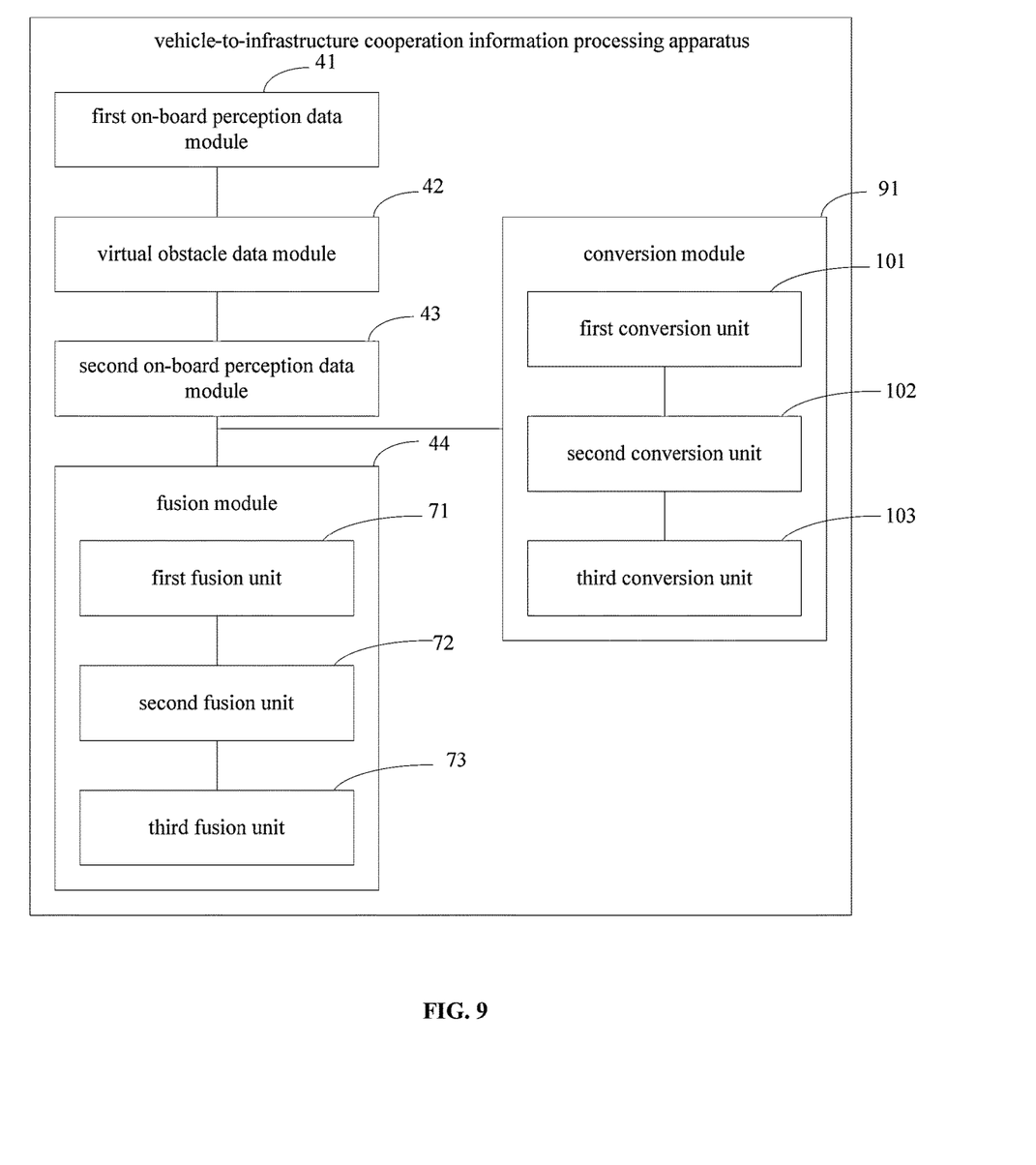
FIG. 9 is a sixth schematic diagram of a vehicle-to-infrastructure cooperation information processing apparatus according to an embodiment of the present application.

In one embodiment, as shown in FIG. 9, the conversion module 91 includes:

a first conversion unit 101 configured for skipping a first field to be filled corresponding to the first obstacle data in the data of the target format, to obtain a first filling result;

a second conversion unit 102 configured for filling the second obstacle data of the fusion data into a corresponding second field to be filled in the data of the target format and adding a blind zone obstacle mark to obtain a second filling result; and a third conversion unit 103 configured for obtaining the format converted fusion data, according to the first filling result and the second filling result.

Figure 10:
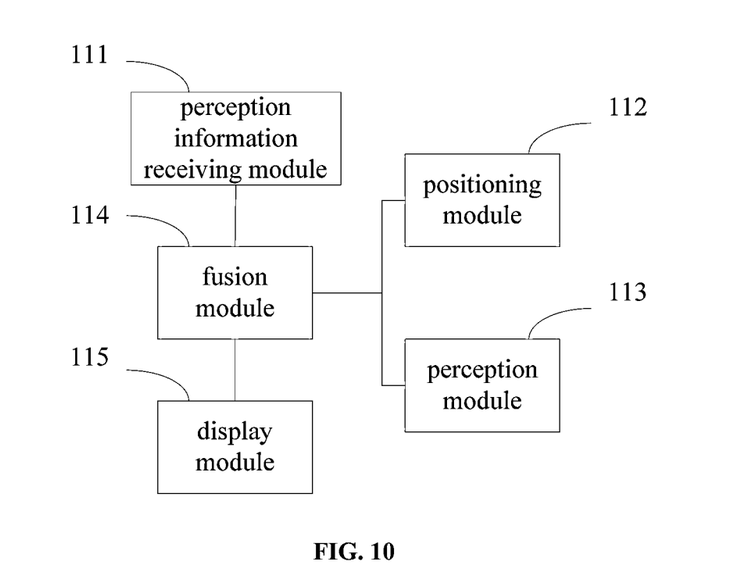
FIG. 10 is a seventh schematic diagram of a vehicle-to-infrastructure cooperation information processing apparatus according to an embodiment of the present application.

In an example of the present application, a vehicle-to-infrastructure cooperation information processing apparatus includes structures as shown in FIG. 10, including: a perception information receiving module 111, a positioning module 112, a perception module 113, a fusion module 114 and a display module 115.

The perception information receiving module 111 is configured for receiving roadside perception information. The positioning module 112 is configured for obtaining positioning information of a target vehicle. The perception module 113 is configured for obtaining on-board perception information collected by an on-board perception system of the target vehicle. The fusion module 114 is configured for obtaining fusion information according to the positioning information from the positioning module 112, the roadside perception information from the perception information receiving module 111 and the on-board perception information from the perception module 113. The display module 115 may be a human machine interface (HMI) apparatus for displaying the fusion information or displaying the fusion information with the target vehicle being removed. In this example, the perception information receiving module 111, the positioning module 112, the perception module 113, the fusion module 114 and the display module 115 shown in FIG. 10 constitute a main vehicle (target vehicle) discovery and full perception fusion framework. The frame structure is simple, the number of modules is small, and the data processing process is simplified. Meanwhile, the problem of fusion of the roadside perception information and the on-board perception information can be solved, thereby providing more comprehensive information and solving product demands for displaying unique information of the roadside perception such as a blind-zone vehicle and a zombie vehicle, in vehicle-side fusion data.

Figure 11:
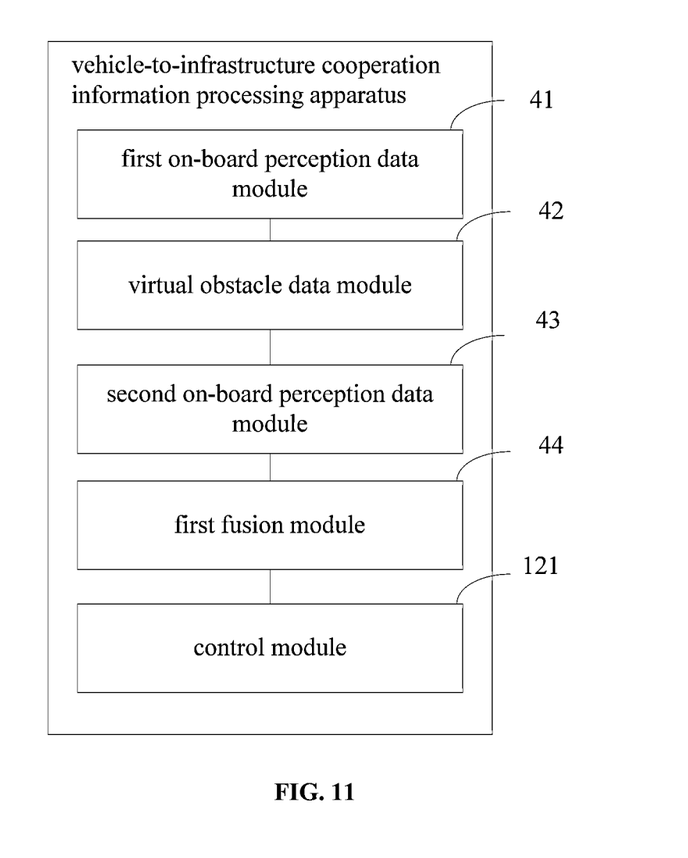
FIG. 11 is an eighth schematic diagram of a vehicle-to-infrastructure cooperation information processing apparatus according to an embodiment of the present application.

In one embodiment, as shown in FIG. 11, the vehicle-to-infrastructure cooperation information processing apparatus further includes:

a control module 121 configured for controlling the target vehicle according to the fusion data.

Functions of various modules in each apparatus of the embodiment of the present application may be referred to the corresponding description in the foregoing method, and will not be repeated here.

According to the embodiments of the present application, the present application further provides an electronic device and a readable storage medium.

Figure 12:
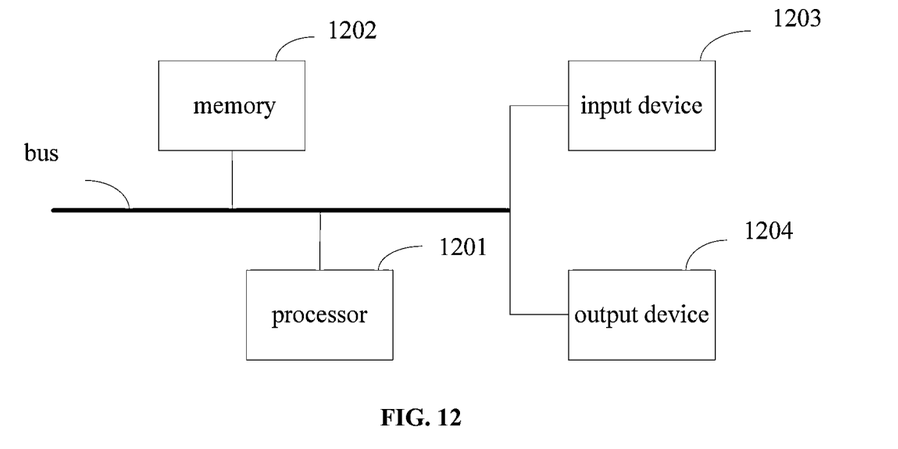
FIG. 12 is a block diagram of an electronic device for implementing a vehicle-to-infrastructure cooperation information processing method according to an embodiment of the present application.

FIG. 12 is a block diagram of an electronic device for a vehicle-to-infrastructure cooperation information processing method according to an embodiment of the present application. The electronic device is intended to represent various forms of digital computers, such as laptop computers, desktop computers, workstations, personal digital assistants, servers, blade servers, mainframe computers, and other suitable computers. The electronic device may further represent various forms of mobile apparatus, such as personal digital assistants, cellular telephones, smart phones, wearable apparatus, and other similar computing apparatus. The components shown herein, their connections and relationships, and their functions are by way of example only and are not intended to limit the implementations of the present application described and/or claimed herein.

As shown in FIG. 12, the electronic device includes: one or more processors 1201, a memory 1202, and interfaces for connecting various components, including high-speed interfaces and low-speed interfaces. The various components are interconnected using different buses and may be mounted on a common motherboard or otherwise as desired. The processor may process instructions for execution within the electronic device, including instructions stored in the memory or on the memory to display graphical information of a Graphical User Interface (GUI) on an external input/output apparatus, such as a display apparatus coupled to the interface. In other embodiments, multiple processors and/or multiple buses and multiple memories may be used with multiple memories if desired. Similarly, multiple electronic devices may be connected, each providing part of the necessary operations (e.g., as an array of servers, a set of blade servers, or a multiprocessor system). In FIG. 12, one processor 1201 is taken as an example.

The memory 1202 is a non-transitory computer-readable storage medium provided herein. Therein, the memory stores instructions executable by at least one processor to enable the at least one processor to implement the vehicle-to-infrastructure cooperation information processing method provided herein. The non-transitory computer-readable storage medium of the present application stores computer instructions for enabling a computer to implement the vehicle-to-infrastructure cooperation information processing method provided herein.

The memory 1202, as a non-transitory computer-readable storage medium, may be used to store non-transitory software programs, non-transitory computer-executable programs, and modules, such as program instructions/modules (e.g., the first on-board perception data module 41, the virtual obstacle data module 42, the second on-board perception data module 43 and the first fusion module 44 shown in FIG. 4) corresponding to the vehicle-to-infrastructure cooperation information processing method of embodiments of the present application. The processor 1201 executes various functional applications of the server and data processing, i.e., a vehicle-to-infrastructure cooperation information processing method in the above-mentioned method embodiment, by operating non-transitory software programs, instructions, and modules stored in the memory 1202.

The memory 1202 may include a program storage area and a data storage area, wherein the program storage area may store an application program required by an operating system and at least one function; the data storage area may store data created according to the use of the electronic device for the vehicle-to-infrastructure cooperation information processing method, etc. In addition, the memory 1202 may include high speed random access memory, and may also include a non-transitory memory, such as at least one magnetic disk storage apparatus, a flash memory apparatus, or other non-transitory solid state memory apparatus. In some embodiments, the memory 1202 may optionally include memories remotely located with respect to processor 1201, which may be connected via a network to the foregoing electronic device. Examples of such networks include, but are not limited to, the Internet, intranet, local area networks, mobile communication networks, and combinations thereof.

The foregoing electronic device may further include: an input apparatus 1203 and an output apparatus 1204. The processor 1201, the memory 1202, the input apparatus 1203, and the output apparatus 1204 may be connected via a bus or otherwise. FIG. 12 takes a bus connection as an example.

The input apparatus 1203 may receive input numeric or character information and generate key signal inputs related to user settings and functional controls of the electronic device, such as input apparatus including touch screens, keypads, mice, track pads, touch pads, pointing sticks, one or more mouse buttons, track balls, joysticks, etc. The output apparatus 1204 may include display apparatus, auxiliary lighting apparatus (e.g., LEDs), tactile feedback apparatus (e.g., vibration motors), and the like. The display apparatus may include, but is not limited to, a Liquid Crystal Display (LCD), a Light Emitting Diode (LED) display, and a plasma display. In some embodiments, the display apparatus may be a touch screen.

One embodiment of the present application provides an autonomous vehicle including the electronic device provided in any one of the embodiments of the present application, thereby realizing a main vehicle discovery and full perception fusion framework and displaying unique information of the roadside perception such as a blind-zone vehicle and a long standing vehicle, in the fusion data.

Various embodiments of the systems and techniques described herein may be implemented in digital electronic circuit system, integrated circuit systems, Application Specific Integrated Circuits (ASICs), computer hardware, firmware, software, and/or combinations thereof. These various embodiments may include: implementation in one or more computer programs which can be executed and/or interpreted on a programmable system including at least one programmable processor, and the programmable processor may be a dedicated or general-purpose programmable processor which can receive data and instructions from, and transmit data and instructions to, a memory system, at least one input apparatus, and at least one output apparatus.

These computing programs (also referred to as programs, software, software applications, or codes) include machine instructions of a programmable processor, and may be implemented using high-level procedural and/or object-oriented programming languages, and/or assembly/machine languages. As used herein, the terms "machine-readable medium" and "computer-readable medium" refer to any computer program product, apparatus, and/or device (e.g., magnetic disk, optical disk, memory, programmable logic apparatus (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide an interaction with a user, the systems and techniques described herein may be implemented on a computer having: a display apparatus (e.g., a Cathode Ray Tube (CRT) or Liquid Crystal Display (LCD) monitor) for displaying information to a user; and a keyboard and a pointing apparatus (e.g., a mouse or a trackball) by which a user can provide input to the computer. Other types of apparatus may also be used to provide interaction with a user; for example, the feedback provided to the user may be any form of sensory feedback (e.g., visual feedback, audile feedback, or tactile feedback); and input from the user may be received in any form, including acoustic input, audio input, or tactile input.

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or in a computing system that includes any combination of such background component, middleware component, or front-end component. The components of the system may be interconnected by digital data communication (e.g., a communication network) of any form or medium. Examples of the communication network include: Local Area Networks (LANs), Wide Area Networks (WANs), and the Internet.

The computer system may include a client and a server. The client and the server are typically remote from each other and typically interact through a communication network. A relationship between the client and the server is generated by computer programs operating on respective computers and having a client-server relationship with each other.

According to the technical solution of the embodiment of the present application, the virtual obstacle data of the target vehicle is added to the first on-board perception data acquired by the on-board perception system of the target vehicle to obtain the second on-board perception data, and then the second on-board perception data is fused with the roadside perception data obtained by the roadside perception system. The processing of the first on-board perception data is relatively easy and may be performed immediately after collection data of a vehicle collection system is generated. Therefore, through a relatively simplified data pre-processing work, the second on-board perception data and the roadside perception data can be fused through a quicker fusion operation, thereby providing more efficient preparation data for downstream products to use the fusion data.

It will be appreciated that the various forms of flow, reordering, adding or removing steps shown above may be used. For example, the steps recited in the present application may be performed in parallel or sequentially or may be performed in a different order, so long as the desired results of the technical solutions disclosed in the present application can be achieved, and no limitation is made herein.

The above-mentioned embodiments are not to be construed as limiting the scope of the present application. It will be apparent to a person skilled in the art that various modifications, combinations, sub-combinations and substitutions are possible, depending on design requirements and other factors. Any modifications, equivalents, and improvements within the spirit and principles of this application are intended to be included within the scope of the present application.

What is claimed is:

1. A vehicle-to-infrastructure cooperation information processing method, comprising:
   acquiring first on-board perception data of a target vehicle, the first on-board perception data comprising data of an obstacle around the target vehicle sensed by the target vehicle;
   generating virtual obstacle data for representing the target vehicle according to positioning data of the target vehicle;
   generating second on-board perception data based on the virtual obstacle data and the first on-board perception data; and
   fusing the second on-board perception data with roadside perception data to obtain fusion data, the fusion data comprising all obstacle data in both the second on-board perception data and the roadside perception data, and obstacle data in the roadside perception data comprising obstacle data for representing the target vehicle, wherein the generating the virtual obstacle data for representing the target vehicle according to the positioning data of the target vehicle, comprises:
acquiring appearance information of the target vehicle;
generating a virtual data frame according to the appearance information of the target vehicle;
obtaining a center point position and heading of the target vehicle according to the positioning data of the target vehicle; and
generating the virtual obstacle data for representing the target vehicle based on the virtual data frame and the center point position and heading of the target vehicle.

2. The method of claim 1, wherein the generating the second on-board perception data based on the virtual obstacle data and the first on-board perception data, comprises:
assigning a first target value to a type field of the virtual obstacle data for representing the target vehicle; and
adding the virtual obstacle data assigned with the first target value to the first on-board perception data to obtain the second on-board perception data.

3. The method of claim 2, wherein the fusing the second on-board perception data with the roadside perception data to obtain the fusion data, comprises:
generating first obstacle data for representing the target vehicle, according to the virtual obstacle data for representing the target vehicle in the second on-board perception data and the obstacle data for representing the target vehicle in the roadside perception data;
determining a blind zone obstacle according to the second on-board perception data and the roadside perception data; generating second obstacle data based on the blind zone obstacle; wherein a second target value is assigned to a type field of the second obstacle data; and
obtaining the fusion data according to the first obstacle data and the second obstacle data.

4. The method of claim 3, further comprising:
filling a field to be filled in data of a target format according to the fusion data, to obtain format converted fusion data; wherein the data of the target format comprises a plurality of fields to be filled.

5. The method of claim 4, wherein the filling the field to be filled in the data of the target format according to the fusion data, to obtain the format converted fusion data, comprises:
skipping a first field to be filled corresponding to the first obstacle data in the data of the target format, to obtain a first filling result;
filling the second obstacle data of the fusion data into a corresponding second field to be filled in the data of the target format and adding a blind zone obstacle mark to obtain a second filling result; and
obtaining the format converted fusion data, according to the first filling result and the second filling result.

6. A non-transitory computer-readable storage medium storing computer instructions, wherein computer instructions enable a computer to perform the method of claim 2.

7. A non-transitory computer-readable storage medium storing computer instructions, wherein computer instructions enable a computer to perform the method of claim 3.

8. A non-transitory computer-readable storage medium storing computer instructions, wherein computer instructions enable a computer to perform the method of claim 4.

9. The method of claim 1, further comprising:
controlling the target vehicle according to the fusion data.

10. A non-transitory computer-readable storage medium storing computer instructions, wherein computer instructions enable a computer to perform the method of claim 1.

11. A vehicle-to-infrastructure cooperation information processing apparatus, comprising:
a processor and a memory for storing one or more computer programs executable by the processor,
wherein when executing at least one of the computer programs, the processor is configured to perform operations comprising:
acquiring first on-board perception data of a target vehicle, the first on-board perception data comprising data of an obstacle around the target vehicle sensed by the target vehicle;
generating virtual obstacle data for representing the target vehicle according to positioning data of the target vehicle;
obtaining second on-board perception data based on the virtual obstacle data and the first on-board perception data; and
fusing the second on-board perception data with roadside perception data to obtain fusion data, the fusion data comprising all obstacle data in both the second on-board perception data and the roadside perception data, and the obstacle data in the roadside perception data comprising obstacle data for representing the target vehicle,
wherein when executing at least one of the computer programs, the processor is further configured to perform operations comprising:
acquiring appearance information of the target vehicle;
generating a virtual data frame according to the appearance information of the target vehicle;
obtaining a center point position and heading of the target vehicle according to the positioning data of the target vehicle; and
generating the virtual obstacle data for representing the target vehicle by setting the virtual data frame according to the center point position and heading of the target vehicle.

12. The apparatus of claim 11, wherein when executing at least one of the computer programs, the processor is further configured to perform operations comprising:
assigning a first target value to a type field of the virtual obstacle data for representing the target vehicle; and
adding the virtual obstacle data assigned with the first target value to the first on-board perception data to obtain the second on-board perception data.

13. The apparatus of claim 12, wherein when executing at least one of the computer programs, the processor is further configured to perform operations comprising:
generating first obstacle data for representing the target vehicle, according to the virtual obstacle data for representing the target vehicle in the second on-board perception data and the obstacle data for representing the target vehicle in the roadside perception data;
determining a blind zone obstacle according to the second on-board perception data and the roadside perception data; generating second obstacle data based on the blind zone obstacle; wherein a second target value is assigned to a type field of the second obstacle data; and
obtaining the fusion data according to the first obstacle data and the second obstacle data.

14. The apparatus of claim 13, wherein when executing at least one of the computer programs, the processor is further configured to perform operations comprising:

filling a field to be filled in data of a target format according to the fusion data, to obtain format converted fusion data; wherein the data of the target format comprises a plurality of fields to be filled.

15. The apparatus of claim 14, wherein when executing at least one of the computer programs, the processor is further configured to perform operations comprising:

skipping a first field to be filled corresponding to the first obstacle data in the data of the target format, to obtain a first filling result;

filling the second obstacle data of the fusion data into a corresponding second field to be filled in the data of the target format and adding a blind zone obstacle mark to obtain a second filling result; and obtaining the format converted fusion data, according to the first filling result and the second filling result.

16. The apparatus of claim 11, wherein when executing at least one of the computer programs, the processor is further configured to perform operations comprising:

controlling the target vehicle according to the fusion data.

17. An autonomous vehicle, comprising the vehicle-to-infrastructure cooperation information processing apparatus of claim 11.

* * * * *